United States Patent [19]
Wirsig et al.

[11] Patent Number: 5,247,779
[45] Date of Patent: Sep. 28, 1993

[54] SELF VOIDING JAW FOR PACKAGING MACHINE

[75] Inventors: Ralph C. Wirsig, Kingston; James W. Sadler, Toronto; John R. Thompson, Kingston, all of Canada

[73] Assignee: Du Pont Canada Inc., Mississauga, Canada

[21] Appl. No.: 842,201

[22] PCT Filed: Nov. 21, 1990

[86] PCT No.: PCT/CA90/00407
§ 371 Date: Mar. 19, 1992
§ 102(e) Date: Mar. 19, 1992

[87] PCT Pub. No.: WO91/08954
PCT Pub. Date: Jun. 27, 1991

[30] Foreign Application Priority Data
Dec. 20, 1989 [GB] United Kingdom ............... 8928799

[51] Int. Cl.[5] ........................... B65B 9/12; B65B 51/30
[52] U.S. Cl. ................................. 53/374.2; 53/373.7; 53/552
[58] Field of Search .............. 53/371.2, 373.7, 374.3, 53/374.5, 374.6, 374.8, 374.2, 552

[56] References Cited

U.S. PATENT DOCUMENTS

| | | | |
|---|---|---|---|
| 3,409,494 | 11/1968 | Korzinek | 53/374.2 X |
| 3,679,509 | 7/1972 | Fielibert | 53/374.2 X |
| 3,874,976 | 4/1975 | MacFarland | 53/374.2 X |
| 3,982,991 | 9/1976 | Hamm et al. | 53/374.2 X |
| 4,306,400 | 12/1981 | Coleman et al. | 53/374.5 |
| 4,369,611 | 1/1983 | Canfield | 53/374.2 X |
| 4,586,317 | 5/1986 | Bussell | 53/374.2 X |
| 4,856,259 | 8/1989 | Woo et al. | 53/374.2 |
| 4,961,302 | 10/1990 | Davis | 53/374.2 X |

Primary Examiner—John Sipos
Assistant Examiner—Linda B. Johnson

[57] ABSTRACT

A heat sealing device adapted for the clamping jaws of form, fill and seal machines. The heat sealing device in a single operation produces a transverse seal in thermoplastic film, tubular containers and severs the tube to simultaneously close the top of a filled container and create the bottom of a next-to-be-filled container. The base, upon which the heat sealing element is mounted, has slots that cause any product on the inner surfaces of the films in the area to be sealed to be removed, thereby producing consistently effective heat seals. The heat sealing device is particularly suitable for packaging flowable materials including, for example, chocolate sundae topping, thick sauces and dressings.

2 Claims, 6 Drawing Sheets

SELF VOIDING JAW FOR PACKAGING MACHINE

The invention relates to a heat sealing device useful for making pouches filled with flowable materials, e.g. thick sauces and dressings, particularly to pouches made on so-called vertical form, fill and seal machines.

It is well known to package flowable materials, for example, milk, on so-called vertical form, fill and seal machines. Using one such a machine, a flat web of synthetic thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After making the transverse seal, but before the jaws of the sealing device are opened, a quantity of material to be packaged, e.g. liquid, is caused to enter the tube, at the filling station, and fill the tube upwardly from the aforementioned transverse seal. The tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device clamps, seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. Contamination of the heat sealing surfaces of the tube may occur due to splashing or drooling of the material to be packaged. One such vertical form and fill machine of the type described above is sold under the trade mark PREPAC. Other machines may be operated such that the material-to-be-packaged is caused to enter the tube continuously rather than intermittently as described above. As a result, sealing of the film takes place with material-to-be-packaged between the heat sealing surfaces in the tube.

With some other machines, the sealing device does not sever the tube at the second transverse section, but does sever the tube subsequently. With yet other machines the jaws of the heat sealing device reciprocate up and down. With such machines, the jaws clamp, seal and sever the tube of film while moving in a downward direction, the jaws then open and return upwards in the open position. The downward movement of the closed jaws also serve to advance the tubular film downwardly.

The present invention relates to heat sealing machines in which the sealing and severing occurs in a single operation.

For many years, milk has been packaged in pouches made on vertical form and fill machines. Such pouches have been sold to household consumers and, in use, such milk-filled pouches are stood within an open-mouthed pitcher. More recently, such pouches have been used to package other flowable comestibles, mayonnaise, caramel, scrambled eggs, tomato ketchup, chocolate fudge, salad dressings, preserves and the like. Pouches containing such comestibles are usually sold to "institutional" buyers, e.g. restaurants.

A sealing device commonly used is a so-called "impulse sealer" in which an electrical current flows through the sealing element for only a fraction of the cycle time between operations. The impulse sealer may be a round wire, e.g. a "piano" wire about 2.00 mm to 2.29 mm diameter, electrically insulated from a water-cooled supporting jaw. After the electrical impulse is fed to the impulse sealer, there is a cooling period in which the seals are "set". Round wire impulse sealers as described above, in combination with conventional flat faced heat sealing jaws, are satisfactory for form and fill machines when packaging liquids such as milk, water or other highly aqueous products. These liquids have relatively high thermal conductivities and thus aid in cooling of the seal after the sealing jaws are opened, i.e. the cooling effect of the liquid on the seal operates before the weight of the liquid can weaken or rupture the bottom seal. Sometimes, too, such liquids vaporize at temperatures below the sealing temperature of the sealing layer of the film and it is speculated that vaporization may aid in removing contamination from the seal area, i.e. the liquid may be "self voiding" from the seal area. Round wire impulse sealers are generally unsatisfactory on form, fill and seal machines when packaging thick flowable materials such as mayonnaise, chocolate fudge, scrambled egg mix, dressings, jams and the like. Other kinds of sealers are known, e.g. as disclosed in U.S. Pat. No. 3,692,613, which issued Sep. 19, 1972 to R. E. Pederson, in U.S. Pat. No. 4,115,182, which issued Sep. 19, 1978 to M. M. Wildmoser and U.S. Pat. No. 4,744,845, which issued May 17, 1988 to J. Posey. Heretofore, however, arrangements of heat sealing elements and heat sealing jaws have not been entirely satisfactory for sealing through thick flowable materials, especially those which contain high sugar concentrations, e.g. above about 50%, or high fat concentrations, e.g. above about 5%. One such material containing high concentrations of sugar and fat is chocolate fudge sundae topping. When sealing through materials it is important to void, as much as possible, the material from the seal area.

Other shapes of impulse heat sealing elements are known. For example, one heat sealing element is made from a flat strip of metal upon which is spot welded a round wire. Another is made from a flat strip of metal, bent so that the heat sealing element comprises two flat elongated fins adjoined by a segment of a tube, each lateral edge of said segment being adjoined to a lateral edge of one of the elongated fins. Such heat sealing elements are intended to provide sufficient pressure and heat at the wire or part-tubular portion to sever the flattened pouch and to form a heat sealed bead at the severed edge, and the angled flat strip/fins provide less pressure than at the tubular part and a decreasing pressure as a function of distance from the tubular part. This pressure and heat provides a wider seal band on the heat sealed film and assists in voiding the flowable material from the heat seal area. The latter types of heat sealing element have several shortcomings when mounted on conventional flat faced heat sealing jaws, which shortcomings the present invention seeks to alleviate. Such shortcomings may include the material not being properly voided from the sealing area and the seal heating and cooling rates being impaired by the presence of too much flowable material in the seal zone.

Accordingly, the present invention provides a heat sealing assembly, for sealing and simultaneously cutting through at least two layers of thermoplastic film, comprising two jaws and an electrical impulse heat sealing element, at least one of said jaws being capable of transverse motion and adapted to collapse a tubular film made from said thermoplastic film and passing between said jaws, the first of said jaws having said element mounted thereon and the second of said jaws having a resilient pad mounted thereon, wherein:

i) said element comprises two flat elongated fins of metal adjoined by a arcuate elongated segment of metal, each lateral edge of the elongated segment being adjoined to a lateral edge of one of the elongated fins, the planes of said fins meeting at an angle of from 140 to 180 degrees, said segment being on the excluded angle side of the planes, the width of each fin being from 1000 to 4000 $\mu$m and the thickness of each fin being from 125 to 500 $\mu$m;

ii) said first jaw is constructed of metal and has an element base, said element base consisting of two flat surfaces which meet at an elongated apex at an angle which is substantially the same as the angle between the planes of the elongated fins of said element, the element and element base being constructed such that there is an air gap between the apex and the arcuate elongated segment of the element, and one or two longitudinal clamping surfaces, each of said clamping surfaces being adjacent to said element base and having a plurality of transverse slots therein such that the unslotted area of each of the clamping surfaces is from about 20 to about 60% of the total area of said clamping surface; and iii) said second jaw has said resilient pad mounted on the face which is adapted to cooperate with the first jaw, said resilient pad, the element base and the clamping surfaces of the first jaw being adapted such that when the first and second jaws are moved into contact with one another the resilient pad and the clamping surfaces firmly hold the thermoplastic films therebetween, and the resilient pad and the elongated segment of the heat sealing element exert sufficient force upon one another that when the heat sealing element is electrically heated the thermoplastic films are sealed and severed by the heat sealing element.

The invention also provides an apparatus for sealing and simultaneously cutting through at least two layers of thermoplastic film, which apparatus includes a heat sealing assembly which comprises two jaws and an electrical impulse heat sealing element, at least one of said jaws being capable of transverse motion and adapted to collapse a tubular film made from said thermoplastic film and passing between said jaws, the first of said jaws having said element mounted thereon and the second of said jaws having a resilient pad mounted thereon, wherein:

i) said element comprises two flat elongated fins of metal adjoined by a arcuate elongated segment of metal, each lateral edge of the elongated segment being adjoined to a lateral edge of one of the elongated fins, the planes of said fins meeting at an angle of from 140 to 180 degrees, said segment being on the excluded angle side of the planes, the width of each fin being from 1000 to 4000 $\mu$m and the thickness of each fin being from 125 to 500 $\mu$m;

ii) said first jaw is constructed of metal and has an element base, said element base consisting of two flat surfaces which meet at an elongated apex at an angle which is substantially the same as the angle between the planes of the elongated fins of said element, the element and element base being constructed such that there is an air gap between the apex and the arcuate elongated segment of the element, and one or two longitudinal clamping surfaces adjacent to said element base, each of said clamping surfaces having plurality of transverse slots therein such that the unslotted area of each of the clamping surfaces is from about 20 to about 60% of the total area of said clamping surface;

iii) said second jaw has said resilient pad mounted on the face which is adapted to cooperate with the first jaw, said resilient pad, the element base and the clamping surfaces of the first jaw being adapted such that when the first and second jaws are moved into contact with one another the resilient pad and the clamping surfaces firmly hold the thermoplastic films therebetween, and the resilient pad and the elongated segment of the heat sealing element exert sufficient force upon one another that when the heat sealing element is electrically heated the thermoplastic films are sealed and severed by the heat sealing element; and iv) means for closing the jaws.

In a preferred embodiment the apparatus is a vertical form and fill machine.

In another embodiment the heat sealing element is made from a single piece of metal having a thickness of from 0.13 to 0.6 mm.

In yet another embodiment the planes of said fins meet at an angle of from 170 to 145 degrees.

In another embodiment the unslotted area of each of the clamping surfaces is from about 40 to about 55% of the total area of said clamping surface.

In a further embodiment the first jaw has an element base separating two clamping surfaces.

An embodiment of the invention is illustrated in the accompanying drawings wherein:

FIGS. 1 and 2 are cross-sectional views of embodiments of the present invention, wherein the first jaw has two clamping surfaces. FIGS. 1 and 2 show the same embodiment with the jaws in the open and closed positions, respectively.

Figure 1:
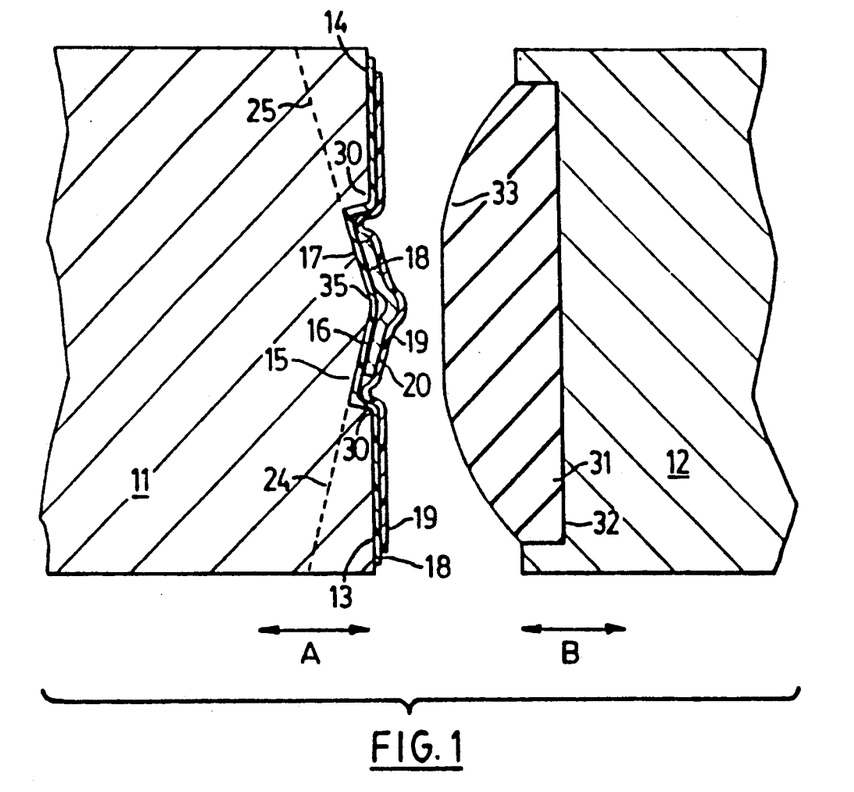

FIG. 1 shows first heat sealing jaw 11 and second heat sealing jaw 12 which are mounted on a form and fill machine (not shown). Both jaws may move in the directions shown by arrows A and B respectively. Between faces 13 and 14 of jaw 11 there is a longitudinal channel 15 which has a shallow W-shaped cross-section. The surfaces 16 and 17 of channel 15 may also be referred to herein as an element base. Placed on faces 13 and 14 of jaw 11 and channel 15 is a layer of woven glass fibre cloth 18 impregnated with TEFLON (trade mark) polytetrafluoroethylene, which acts primarily as an electrical insulator and at least in part as a thermal insulator between the metal of the jaw and heat sealing element 20. Placed over layer 18 and over heat sealing element 20 is a further layer of woven glass fibre cloth 19 impregnated with TEFLON (trade mark) polytetrafluoroethylene, which acts primarily to prevent sticking and burning of the thermoplastic film which, but for the cloth, would come into contact with heat sealing element 20. Heat sealing element 20 has a shape as shown in FIG. 3 wherein two fins 21 and 22 are adjoined by an elongated arcuate segment 23. The "peak" of arcuate segment 23 is shown at 34. As indicated hereinbefore, the angle at which the planes of fins 21 and 22 intersect is from 180 to 140 degrees. It is preferred that the planes intersect at an angle of about 170 to 145 degrees. The cross-section of channel 15 substantially conforms to the angle of fins 21 and 22. Faces 13 and 14 each have slots therein, the bottom of which are shown by dotted lines 24 and 25 respectively, in FIGS. 1 and 2. The slots, 26 and 27, are shown more clearly in FIG. 4. The portions 28 of the face 13 is from about 20 to 50% of the area of face 13 if the slots were not there, and provides the area required to grip the thermoplastic film between portions 30 and silicone rubber pad 31. Heat sealing element 20 is attached to an electrical impulse-providing apparatus (not shown). Second jaw 12 has a longitudinal channel 32 therein, in which is held silicone rubber pad 31. In the embodiments shown in FIGS. 1 and 2 the silicone rubber pad 31 has a convex face 33, or convex with a flattened portion removed, although such a convex face is not essential to the operation of the heat sealing device. From the standpoint of making silicone rubber pad 31 it is preferable that it is rectangular in cross-section, but the shape of jaw 11, and in particular faces 13 and 14, will determine in a large part the preferred shape of silicone rubber pad 31. For example, a silicone rubber pad 31, having a cross-section which is convex with a flattened portion removed, is preferred for the jaw shown in FIG. 5. The apex 35 of longitudinal channel 15 and clamping faces 13 and 14 are adapted to ensure that the relative pressures at peak 34 and fins 21 and 22, when the jaws 11 and 12 are closed, are sufficient for the voiding, sealing and severing operation as is described more fully hereinafter. The portion 28 of the face 13 is from about 20 to 50% of the area of face 13 if the slots were not there, and provides the area required to grip the thermoplastic film between portions 30 and silicone rubber pad 31. Similarly, the portion 29 of the face 14 is from about 20 to 50% of the area of face 14 if the slots were not there, and provides the area required to grip the thermoplastic film between portions 30 and silicone rubber pad 31. Although not shown, it is usual to cover face 33 with a further woven glass fibre cloth impregnated with TEFLON polytetrafluoroethylene. During operation, the jaws 11 and 12 start apart, as shown in FIG. 1. A thermoplastic film tube (not shown) is passed between jaws 11 and 12. The film tube is collapsed transversely as jaws 11 and 12 are caused to approach one another. As jaws 11 and 12 close, the film tube is trapped between cloth 19 and silicone rubber pad 31 by the pressure exerted by heat sealing element 20 and faces 13 and 14 on silicone rubber pad 31, as will be apparent from an examination of FIG. 2. An electrical impulse is fed through heat sealing element 20. The electrical impulse, which heats the heat sealing element 20 sufficiently for the heat to simultaneously heat seal and sever the adjacent tubular film surfaces in a bead-like area as a result of contact with segment 23, and to strengthen the seals on both sides of the severed tube by means of the heat provided by fins 21 and 22. Part of the reason for this is thought to be that segment 23 is hotter than fins 21 and 22 because of the air gap which exists between segment 23 and the immediate area of apex 35 of surfaces 16 and 17 of channel 15. The electrical impulse is then switched off to allow the heat sealing element 20 and the sealed and severed tube to cool sufficiently to "set" the seals. Preferably the severed and sealed portions of the film tube are "set" more quickly by continuous water cooling of first jaw 11. Heat is thus transferred from the hot areas of the sealed film tube, through the metallic heat sealing element 20 to jaw 11. The jaws are then caused to move apart in order to release the film. The seals thus formed are the top seal of a sealed pouch and the bottom seal of the next-to-be-formed pouch. The purpose of cloth 18 is to provide electrical and thermal insulation between metal jaw 11 and heat sealing element 20. Cloth 19 ensures that the film surfaces, during and after the sealing and severing process, do not adhere to any portion of the heat sealing device.

Figure 2:
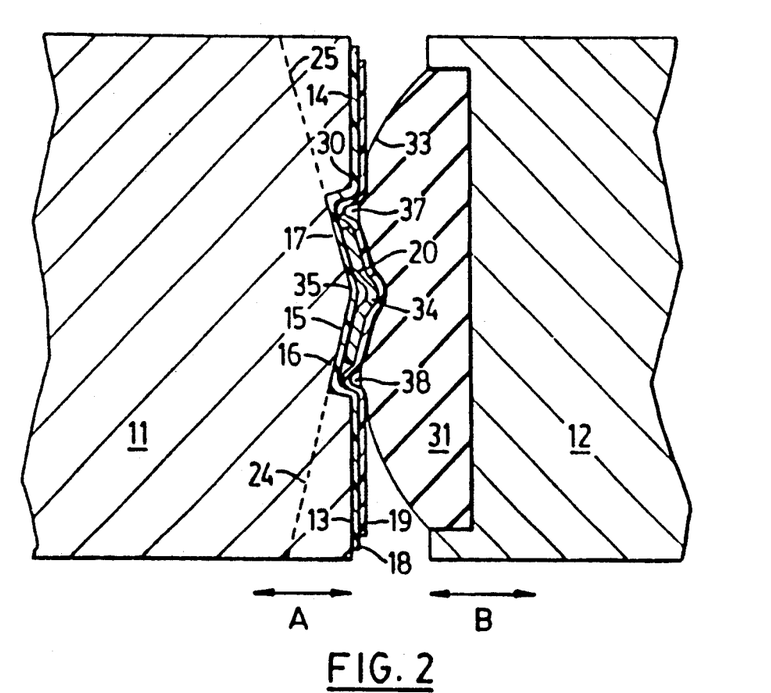
Figure 3:
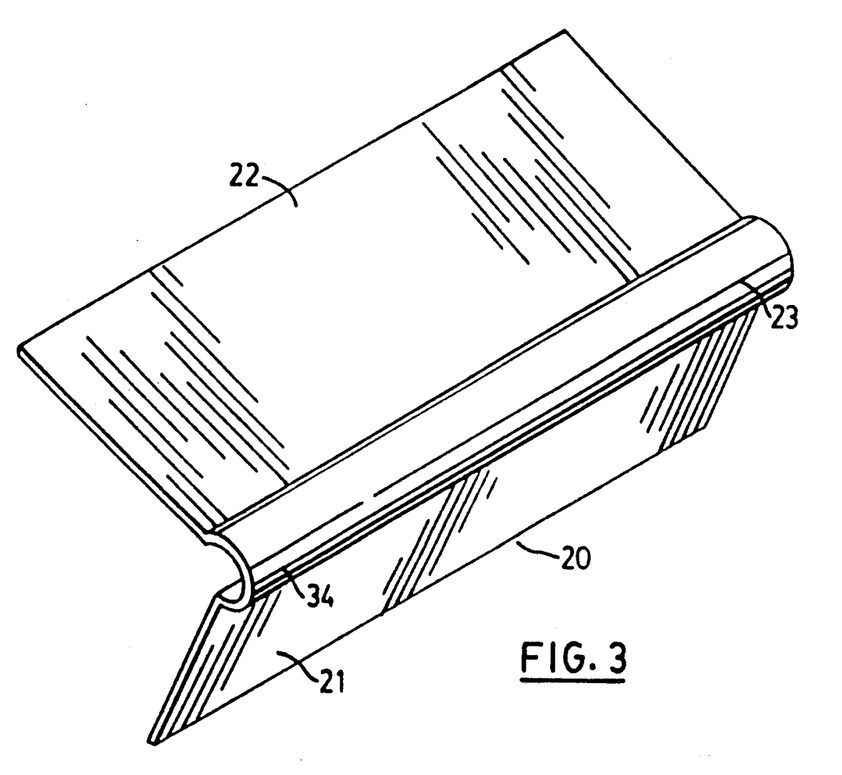
FIG. 3 is a three quarter view of a heat sealing element of the present invention.
Figure 4:
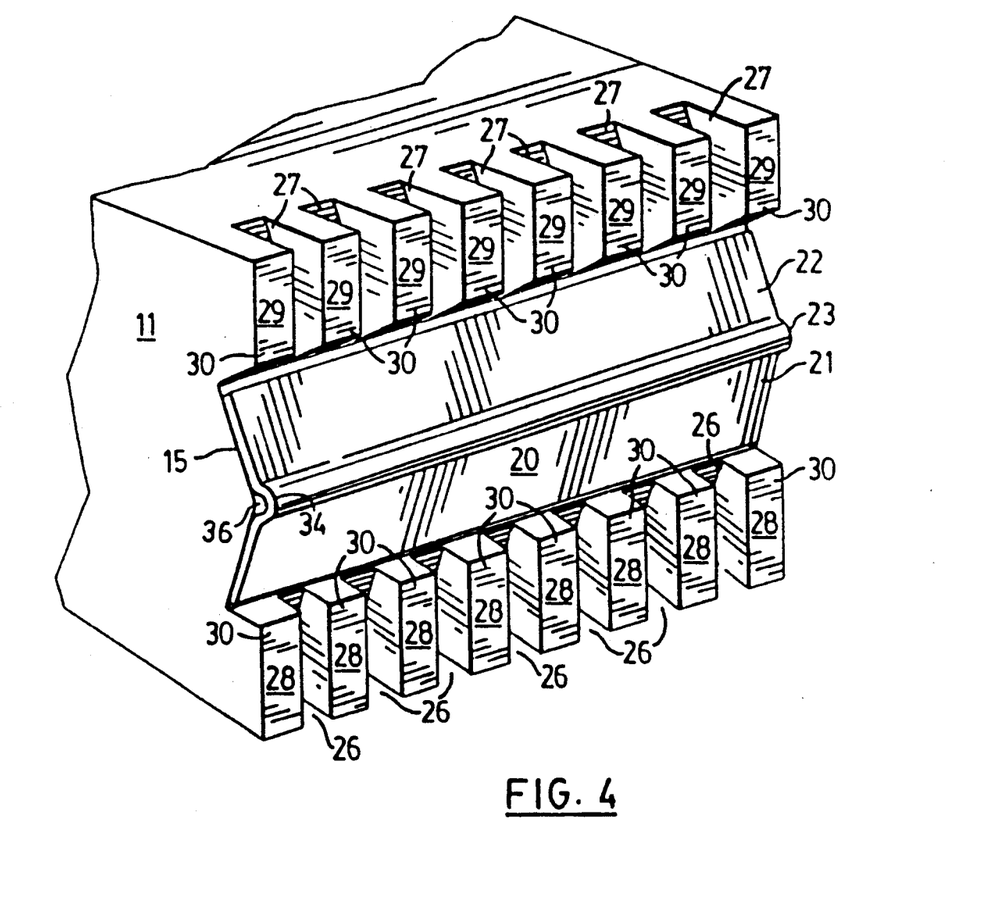
FIG. 4 is a three quarter view of a first jaw, with two clamping surfaces, similar to that shown in FIGS. 1 and 2.

FIG. 4 shows a similar configuration of components as in FIGS. 1 and 2, of the first jaw 11. The slots 26 and 27 provide pressure relief channels for product which is in the tubular film and may otherwise be trapped in pockets 37 and 38 (see FIG. 2). Without such relief channels the flowable material in pockets 37 and 38 is pressurized and may result in leakage of the flowable material from the pouch through the heat seal during the fragile seal making period. Additionally, such leakage during sealing may result in post-sealing leaks at the corners of the pouch, referred to in the art as "corner leakers". For convenience neither of the woven cloths 18 or 19 are shown in FIG. 4.

Figure 5:
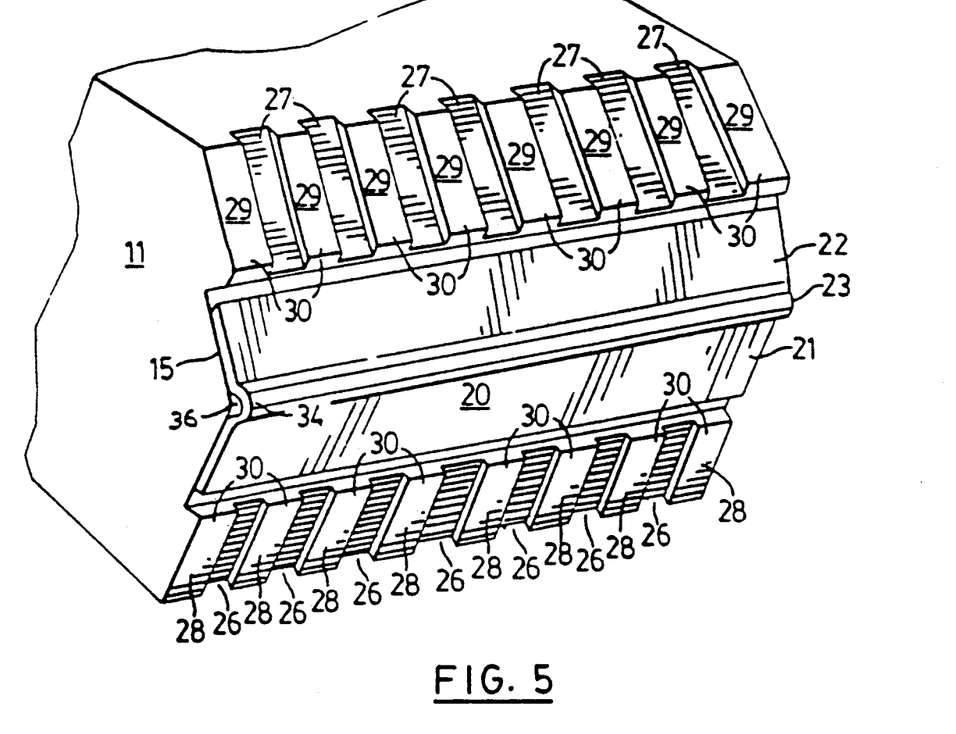
FIG. 5 is a three quarter view of another first jaw, with cut away clamping surfaces.

FIG. 5 shows a first jaw 11 which has many of the benefits of the first jaw shown in FIG. 4. In particular, clamping pressure is applied most at shoulder 30, and voiding relief is still provided by slots 26 and 27. As indicated hereinbefore, in the embodiment shown in FIG. 5 the silicone rubber pad 31 may be one which has a conventionally plane face instead of the convex face 33. A silicone rubber pad having a plane face, in combination with a jaw like that shown in FIG. 1 is not as effective as a pad with a plane face, in combination with a jaw like that shown in FIG. 5.

With respect to the heat sealing element 20 it will be noted that segment 23 allows an air pocket 36 to be present between cloth 18 and the portion of the element which causes severing of the film tube, i.e. portion 23. This air pocket enables a temperature gradient to occur such that the temperature of portion 23 is higher than the temperature of the fins 21 and 22, where much of the sealing occurs. This is desirable when sealing films which contain layers, e.g. nylon, which have melting temperatures higher than the melting temperature of the inner sealing layers, e.g. polyethylene. Ideally the temperature of portion 23 is at a temperature sufficient to sever the film tube while the fins 21 and 22 are at a temperature sufficient to seal the sealing layers.

Although not shown in the drawings the heat sealing element may simply be a ribbon bent in a V, such that the bend is arcuate and forms a simple transition from one fin to the other, i.e. does not have a tubular portion extending outwardly from the planes of the fins. In such a case, the air pocket necessary for development of the temperature gradient between the arcuate portion and the fins may be provided by milling out a longitudinal slot in apex 35.

A preferred heat sealing element is made from a ribbon of nickel-chromium alloy pressed to shape with a press die as is known in the art.

The invention is further illustrated by reference to the following examples:

EXAMPLE 1

A heat sealing element was constructed which comprised two fins, each having a length, breadth and thickness of 223.5 mm, about 1.8 mm and 0.4 mm respectively were joined as in FIG. 3 by an essentially semicircular segment of a tube having internal diameter of 0.5 mm. The fins and segment of tube were formed from a single piece of KANTHAL (trade mark) nickel-chromium alloy ribbon about 5 mm wide, and the fins were at an angle of 30 degrees to one another. A 220 mm wide jaw of a PREPAC (trade mark) IS-3 form and fill machine was machined so that there was a longitudinal W-shaped channel therein, the apex of the W having an angle of 150 degrees so that the fins would fit snugly against the channel. The heat sealing element was mounted as in FIG. 1, with two woven glass fibre cloths impregnated with polytetrafluoroethylene. The second jaw had a longitudinal channel machined therein to accommodate a silicone rubber pad 22 cm long, 18.9 mm wide and about 5.5 mm thick at the thickest point, having a centrally flat portion about 4.9 mm long abutting convex faces of 15 mm radius.

Pouches, 21 cm long, containing one liter (1247 g) chocolate fudge sundae topping were produced on the machine, using a film laminate comprising 50 μm SCLAIRFILM (trade mark) polyethylene film/12 μm ethylene/vinyl alcohol film/50 μm SCLAIRFILM polyethylene film. The tube of film produced was about 364 mm in circumference (182 mm layflat). The pouches were produced at rates of 29 pouches per minute. There were no leakers even after two hours of running.

EXAMPLE 2

Figure 6:
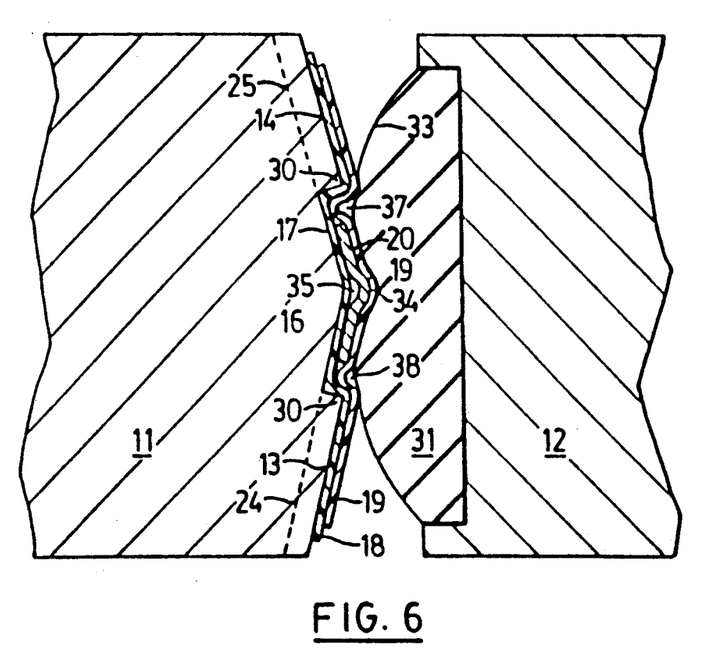
FIG. 6 is a cross-sectional view of an embodiment of the present invention in which the first jaw of FIG. 5 is used.

The results of Example 1 were compared to the results of a conventional heat sealing element and jaw with the same material being packaged in the same film laminate. The heat sealing device of this example was not within the scope of the present invention and is included merely for comparative purposes. The jaw on which the heat sealing element was mounted had a plane face and the heat sealing element was similar in shape to that shown in FIG. 6. The base width and thickness of heat sealing element 30 were 2.03 mm and 0.15 mm respectively. The height of ridge 31 was 0.356 mm and the tip of the ridge had a radius of 0.254 mm. The silicone rubber pad was rectangular in cross-section, having a height and depth of 18.9 and 4 mm respectively. Pouches of the same dimensions as in Example 1 were produced at a rate of 20 pouches per minute. There were 100% leakers, thus demonstrating that the heat sealing element and jaw of Example 1 is superior to the configuration of the present Example.

DESCRIPTION OF THE NUMBERED PARTS

11. First heat sealing jaw
12. Second heat sealing jaw
13. Face of jaw 11
14. Face of jaw 11
15. Longitudinal channel in jaw 11
16. Surface of channel 15
17. Surface of channel 15
18. Woven glass fibre cloth
19. Woven glass fibre cloth
20. Heat sealing element
21. Fin of heat sealing element
22. Fin of heat sealing element
23. Elongated arcuate segment of heat sealing element
24. Bottom of slot 26
25. Bottom of slot 27
26. Slot in face 13
27. Slot in face 14
28. Portion of face 13
29. Portion of face 14
30. Shoulder portion of jaw, at channel 15
31. Silicone rubber pad
32. Longitudinal channel in jaw 12
33. Face of silicone rubber pad
34. Peak of arcuate portion 23 of heat sealing element
35. Apex of longitudinal channel 15
36. Air gap
37. Pocket
38. Pocket

We claim:

1. A heat sealing assembly, for sealing and simultaneously cutting through at least two layers of thermoplastic film, comprising two jaws and an electrical impulse heat sealing element, at least one of said jaws being capable of motion in directions toward and away from the other jaw, and adapted to collapse a tubular film made from the thermoplastic film and passing between said jaws, the first of said jaws having said element mounted thereon and the second of said jaws having a resilient pad mounted thereon, wherein:

i) the element comprises
   a) two flat, elongated thin rectangular metal fins, each having a flat surface defined by a plane oriented such that the angle defined by the intersection of one said plane passing through said flat surface of one fin with the other said plane passing through said flat surface of the other fin is from 140 to 180 degrees, each of said fins having a width from 1000 to 4000 μm and a thickness of from 125 to 500 μm, and
   b) a thin metal elongated segment having an arcuate cross section of arc angle equal to 360 degrees minus said defined angle, said segment being affixed to both of said fins such that one elongated edge of each fin adjoins one elongated edge of said segment;

ii) said first jaw is constructed of metal and has an element base, said element base consisting of two flat surfaces for contacting said flat surfaces of said fins along their planes without an air gap, which base flat surfaces meet at an elongated apex at an angle which is substantially the same as the angle between the planes of the elongated fins of said element, the element and element base being constructed such that there is an air gap between the apex and the arcuate elongated segment of the element, and one or two longitudinal clamping surfaces, each of said clamping surfaces being adjacent to said element base and having a plurality of slots therein for voiding flowable material product trapped in the tubular film between said jaws such that the unslotted area of each of the clamping surfaces is from about 20 to about 60% of the total area of said clamping surface; and iii) said second jaw has said resilient pad mounted on a face which is adapted to cooperate with the first jaw, said resilient pad, the element base and the clamping surfaces of the first jaw being adapted such that when the first and second jaws are moved into contact with one another the resilient pad and the clamping surfaces firmly hold the thermoplastic films therebetween, and the resilient pad and the elongated segment of the heat sealing element exert sufficient force upon one another that when the heat sealing element is electrically heated the thermoplastic films are simultaneously sealed and severed by the elongated segment of the heat sealing element and both seals are strengthened by the heat from the rectangular fins.

2. An apparatus for sealing and simultaneously cutting through at least two layers of thermoplastic film, which apparatus includes a heat sealing assembly which comprises two jaws and an electrical impulse heat sealing element, at least one of said jaws being capable of motion in directions toward and away from the other jaw, and adapted to collapse a tubular film made from said thermoplastic film and passing between said jaws, the first of said jaws having said element mounted thereon and the second of said jaws having a resilient pad mounted thereon, wherein:

i) the element comprises
  a) two flat, elongated thin rectangular metal fins, each having a flat surface defined by a plane oriented such that the angle defined by the intersection of one said plane passing through said flat surface of one fin with the other said plane passing through said flat surface of the other fin is from 140 to 180 degrees, each of said fins having a width from 1000 to 4000 μm and a thickness of from 125 to 500 μm, and
  b) a thin metal elongated segment having an arcuate cross section of arc angle equal to 360 degrees minus said defined angle, said segment being affixed to both of said fins such that one elongated edge of each fin adjoins one elongated edge of said segment;

ii) said first jaw is constructed of metal and has an element base, said element base consisting of two flat surfaces for contacting said flat surfaces of said fins along their planes without an air gap, which base flat surfaces meet at an elongated apex at an angle which is substantially the same as the angle between the planes of the elongated fins of said element, the element and element base being constructed such that there is an air gap between the apex and the arcuate elongated segment of the element, and one or two longitudinal clamping surfaces, each of said clamping surfaces being adjacent to said element base and having a plurality of slots therein for voiding flowable material product trapped in the tubular film between said jaws such that the unslotted area of each of the clamping surfaces is from about 20 to about 60% of the total area of said clamping surface; and iii) said second jaw has said resilient pad mounted on a face which is adapted to cooperate with the first jaw, said resilient pad, the element base and the clamping surfaces of the first jaw being adapted such that when the first and second jaws are moved into contact with one another the resilient pad and the clamping surfaces firmly hold the thermoplastic films therebetween, and the resilient pad and the elongated segment of the heat sealing element exert sufficient force upon one another that when the heat sealing element is electrically heated the thermoplastic films are simultaneously sealed and severed by the elongated segment of the heat sealing element and both seals are strengthened by the heat from the rectangular fins; and iv) means for closing the jaws.

* * * * *